United States Patent Office 3,457,039
Patented July 22, 1969

3,457,039
BORON POLYMER
Robert E. Williams, La Canada, and Francis J. Gerhart, Temple City, Calif., assignors, by mesne assignments, to Aerojet-General Corporation, El Monte, Calif., a corporation of Ohio
No Drawing. Filed Mar. 28, 1966, Ser. No. 537,647
Int. Cl. C01b 6/22
U.S. Cl. 23—204                                                6 Claims

ABSTRACT OF THE DISCLOSURE

A process for producing a boron hydride polymer through the reaction of a polyloweralkylborane, for example, triethylborane, with a boron hydride such as $B_4H_{10}$.

---

This invention relates to boron chemistry and more particularly to the process for producing, and to the composition of a new boron hydride polymer.

Heretofore, in the production of boron hydrides primarily by pyrolytic reactions, solid indeterminate "yellow solids" have been produced. They have been shown to have compositions $(B_1H_x)_n$ where $x$ is unity or less. When subjected to heating, the hydrogen content of these solids is reduced, leaving brown residues of no known practical use.

In contrast to the aforementioned boron hydride polymer of little value, we have produced a hydrogen enriched stable boron hydride polymer exhibiting no measurable vapor pressure. This boron hydride polymer having the empirical formula $(B_2H_4)_n$ has the highest hydrogen-to-boron ratio of any known solid boron hydride and, consequently, has a significant energy content important for use as a solid fuel or as a fuel additive for other liquid fuels such as JP-4 to boost performance, remove water or inhibit growth of microorganisms. More important, its polymeric nature makes it valuable as a binder or gelling agent for known fuel materials such as aluminum powder and light metal hydrides (e.g., lithium, boron, beryllium, and aluminum hydrides). Another use is as an intermediary for the production in situ, by means of pyrolysis, of boron coatings on materials such as tungsten.

Also, by way of contrast to the relatively severe pyrolytic or Lewis base catalyzed reactions used in the production of other boron hydrides, this new polymer is produced at relatively low temperatures merely by the reaction of a boron hydride having a hydrogen-to-boron ratio of two or more with an excess of a polyalkylboron. The process basically involves the abstraction of a sufficient number of $BH_3$ groups from certain hydrides of boron which have a hydrogen-to-boron or H/B ratios greater than two until, under mild conditions such as 0° to 50° C., the polymer is formed wherein the H/B ratio equals two.

This new polymer was first produced by subjecting tetraborane-10 ($B_4H_{10}$) to large excesses of the reagent triethylboron ($BEt_3$) with the expectation that there would be an exchange of alkyl groups between reactants and/or abstraction of $BH_3$ groups from the tetraboron-10. Species such as $R_xB_4H_{10-x}$ and $R_xB_3H_{7-x}$ were anticipated. However, neither of these compound families were observed although the expected dehydroboration occurred and two $BH_3$ groups were either abstracted from tetraborane-10 or sorbed when tetraborane-10 decomposed. The corresponding alkylated diborane, $Et_4B_2H_2$, was produced by exchange. The remaining two-boron and four-hydrogen atoms form the polymer $(B_2H_4)_n$.

The diborane-4, $(B_2H_4)_n$, polymer of the invention at temperatures below 100° C. is a colorless or translucent stable solid having no measurable vapor pressure below the temperature at which it decomposes. It dissolves easily in nonpolar solvents such as benzene and chloroform. The diborane-4 polymer, when heated in a closed system, exhibits no discoloration or hydrogen evolution below 100° C. Detectable hydrogen evolution occurs around 120°–130° C., and a faint yellow tint becomes apparent by the time the temperature reaches 150° C. Rapid heating of the polymer to the annealing temperature of its Pyrex container produces a manifold increase in hydrogen evolution and leaves a solid dark brown residue. No sublimation is perceptible and only minute quantities, much less than 1%, of condensable material are produced, indicating the absence of any residual ethyl groups or condensable boron hydrides.

The 12.8 mc. $B^{11}$ nuclear magnetic resonance spectrum of the polymer of the invention dissolved in chloroform indicates that only a single form of boron is present. The infrared spectrum reveals the presence of BH groups and B—H—B bridges and the absence of C—H groups. From these observations, the basic structure of the polymer is believed to incorporate the tetradentate unit;

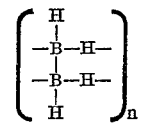

arranged in ladder, sheet or crosslinked configuration, where $n$ is in excess of 5 and preferably in excess of 10.

At present, we have no evidence of diborane-4 existing as the monomer, $B_2H_4$, a theoretical concept entirely consistent with the contention of R. J. Brotherton (Progress in Boron Chemistry, vol. 1, The Macmillan Co., New York, N.Y. 1964), that the diborane-4 monomer would be expected to be a relatively unstable species.

EXAMPLE 1

One example of a process for producing the new polymer involves the reaction;

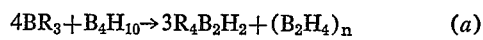

where R is a lower alkyl group, for example methyl, ethyl, propyl, butyl or amyl and preferably the ethyl group.

This reaction has been demonstrated with stoichiometric results when tetraborane-10, $B_4H_{10}$ (65 mmole), and triethylboron $BEt_3$ (3.84 mmoles) are placed in a sealed 5-mm. OD Pyrex tube, allowed to stand for 24 hours at room temperature, and then heated for one hour at 50° C. The progress of the reaction may by followed by significant volume shrinkage. The $B^{11}$ n.m.r. spectrum of the product reveals the presence of $BEt_3$ and $Et_4B_2H_2$ in an apparent 1:2.6 ratio based upon calibrated spectral area measurements. The solids of $(B_2H_4)_n$ are isolated (15.2 mg.) from the volatiles by vacuum evaporation, wherein the volatiles (combined $BEt_3$ and $Et_4B_2H_2$, 3.21 mmoles) are removed.

The reaction has been scaled up and the same stoichiometry as in the original experiment was observed. Much more of the $(B_2H_4)_n$ polymer remained in or was formed in solution, possibly because of the relatively smaller deposition surface available. When the excess $Et_3B$ and $Et_4B_2H_2$ were removed at the completion of the reaction, a two-phase low viscosity liquid remained in the reaction chamber. Prolonged evacuation to remove the volatiles and heating to 60° C. resulted in one phase, the upper or less dense lower viscosity phase was converted into the transparent "glassy" polymeric lower phase. The upper phase was apparently the $Et_3B$-$Et_4B_2H_2$ solution saturated with $(B_2H_4)_n$ polymer while the lower phase was the polymer saturated with $Et_3B$ and $Et_4B_2H_4$.

The success of the tetraborane-10, $B_4H_{10}$, reaction with triethylboron, $Et_3B$ suggests that a number of $BH_3$ abstraction processes may result in the production of the $(B_2H_4)_n$ polymer.

EXAMPLE 2

Trimethylborane, BMe$_3$, rather than the triethylborane may be used as a BH$_3$ absorber under the same conditions as was triethylboron, whereupon the following reaction occurs:

$$B_4H_{10} + 4Me_3B \longrightarrow 1/n\ (B_2H_4)_n + 3Me_4B_2H_2 \quad (b)$$

In one case, Me$_3$B and B$_4$H$_{10}$ were reacted in a 4:1 ratio. After several days of reaction at room temperature, only very small amounts, B$_4$H$_{10}$ and Me$_3$B remained. When heated for one hour at 50° C. virtually complete reaction was observed, Me$_4$B$_2$H$_2$ and a solid had been formed, while both B$_4$H$_{10}$ and Me$_3$B had essentially disappeared as determined by B$^{11}$ n.m.r. spectrometry. We prefer the triethylboron to the methyl analog because of the greater tendency of methyl groups to form bridge bonds which may complicate the reaction. The tributyl and tripropyl-borons will also serve as useful reactants.

Other examples

Other candidate BH$_3$ group "sinks" or sorbers are Et$_4$B$_2$H$_2$ and (Me$_2$N BH$_2$)$_{2\ or\ 3}$ which may eliminate BH$_3$ groups by disproportionation as follows:

$$Et_4B_2H_2 + 2(BH_3) \rightarrow 2Et_2B_2H_4$$

$$1/n\ (Me_2N\ BH_2)_n + BH_3 \longrightarrow Me_2NB_2H_5$$

The preferred BH$_3$ group source is B$_4$H$_{10}$ because of its known capacity to produce the (B$_2$H$_4$)$_n$ polymer; however, other boron hydrides may also be candidates. Other suitable candidate boron hydrides are those having H/B ratios equal to or greater than 2. Of this potential group, B$_5$H$_{11}$ and B$_6$H$_{12}$ have been discovered to date.

These variations and others may be made without departing from the spirit and scope of this invention. The monopoly granted under the patent laws of the United States is therefore determined not by the specific embodiments illustrated, but rather by the scope of the following claims and their equivalents.

What is claimed is:

1. The process for producing a boron hydride polymer comprising the step of reacting a polyloweralkylborane containing no unsaturated organic group with a boron hydride selected from the group consisting of B$_4$H$_{10}$, B$_5$H$_{11}$ and B$_6$H$_{12}$, and recovering the polymer product formed.

2. The process in accordance with claim 1 wherein the reactions are carried out at a temperature in the range of 0° to 50° C.

3. The process in accordance with claim 1 wherein an excess of trialkylborane is provided.

4. The process in accordance with claim 1 wherein the polyalkylborane comprises triethylborane.

5. The process in accordance with claim 1 wherein the boron hydride comprises B$_4$H$_{10}$ and wherein the reaction is carried on at a temperature in the range of 0° C. to 50° C.

6. The process in accordance with claim 1 wherein the polyalkylborane comprises trimethylborane.

References Cited

UNITED STATES PATENTS

| | | | |
|---|---|---|---|
| 3,066,170 | 11/1962 | Ramsden | 260—606.5 |
| 3,135,802 | 6/1964 | Kendrick et al. | 260—606.5 |

OTHER REFERENCES

Schlesinger et al.: "Journal of The American Chemical Society," vol. 57, pp. 622 and 25; April 1935.

OSCAR R. VERTIZ, Primary Examiner

G. O. PETERS, Assistant Examiner

U.S. Cl. X.R.

23—363